US012763948B2

(12) United States Patent
Kurian et al.

(10) Patent No.: US 12,763,948 B2
(45) Date of Patent: Oct. 13, 2026

(54) ALTERNATING ENCRYPTION SCHEMES

(71) Applicant: Bank of America Corporation, Charlotte, NC (US)

(72) Inventors: Manu Kurian, Dallas, TX (US); Jabir Mahammad, Tolichowki Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 130 days.

(21) Appl. No.: 18/901,323

(22) Filed: Sep. 30, 2024

(65) Prior Publication Data

US 2026/0113190 A1 Apr. 23, 2026

(51) Int. Cl.
*H04L 29/00* (2006.01)
*G06N 10/20* (2022.01)
*H04L 9/06* (2006.01)
*H04L 9/14* (2006.01)

(52) U.S. Cl.
CPC ............... *H04L 9/14* (2013.01); *G06N 10/20* (2022.01); *H04L 9/0631* (2013.01)

(58) Field of Classification Search
CPC .......... H04L 9/14; H04L 9/0631; G06N 10/20
See application file for complete search history.

(56) References Cited

U.S. PATENT DOCUMENTS 10,997,279 B2 * 5/2021 Antonatos ........... H04L 63/1491
12,596,816 B2 * 4/2026 Karr .................... G06F 11/1453
2019/0068563 A1 * 2/2019 Kurian .................. H04L 9/3231
2021/0083865 A1 * 3/2021 Obadia .................. H04L 9/0852
2023/0396592 A1 * 12/2023 Sawaya ............... H04L 63/1425
2024/0056438 A1 * 2/2024 Bandy .............. G06K 19/06037

* cited by examiner

*Primary Examiner* — Ghazal B Shehni
(74) *Attorney, Agent, or Firm* — Weiss & Arons LLP

(57) ABSTRACT

Apparatus, methods and systems for dynamically encrypting data. Methods may include encrypting a dataset with a first encryption scheme. Methods may include storing the dataset in a first memory location. Methods may include continually executing an alternating encryption scheme. The alternating encryption scheme may include replacing the first encryption scheme with a second encryption scheme at randomly selected times. Methods may include detecting an attempted breach of the first encryption scheme. Methods may include replacing the dataset with a decoy dataset. Methods may include re-encrypting the dataset with a third encryption scheme. Methods may include storing the dataset in a second memory location. Based on monitoring the attempted breach, methods may include identifying access points having greater than a threshold level of vulnerability to attempted breaches. Methods may include adding an additional layer of encryption to the identified access points. Methods may include resuming the alternating encryption scheme.

20 Claims, 9 Drawing Sheets

ALTERNATING ENCRYPTION SCHEMES

FIELD OF TECHNOLOGY

Aspects of the disclosure relate to encryption, artificial intelligence and quantum computing.

BACKGROUND OF THE DISCLOSURE

As technology continuously improves, it has become easier for malicious actors to decipher keys to encryption schemes, and to use the keys to decrypt encrypted data. Specifically, recent computing improvements have enabled malicious actors to decipher keys to standard encryption schemes in a faster timeframe with a lower level of difficulty. Computing improvements include improvements in quantum computing and artificial intelligence ("AI"). Computer improvements speed up calculations and enable complex calculation abilities. Computing improvements enable malicious actors to decipher encryption schemes quickly. With these improvements in technology, encrypted data may not be as secure as it was with previous encryption methods. Accordingly, static encryption schemes may no longer be useful to prevent the malicious actors from accessing the encrypted data.

It may therefore be desirable to provide systems, apparatus and methods to enable real-time dynamic data encryption. It may also be desirable to utilize quantum computing and AI with the dynamic data encryption schemes.

SUMMARY OF THE DISCLOSURE

Systems, apparatus and methods for dynamically encrypting data are provided.

The methods may leverage artificial intelligence. The methods may leverage quantum computing.

The methods may include encrypting a dataset. The methods may include encrypting the dataset using an encryption engine. The encryption may encrypt the dataset using a first encryption scheme.

The encryption engine may be executed on a computing platform. The computing platform may include a classical computing platform. The classical computing platform may include a network of one or more computing devices. Computing devices may include desktop computers, laptops, smartphones, tablets, mainframe computers, supercomputers, minicomputers and/or any other suitable computing devices. The network may include an edge network, a local area network ("LAN"), a wide area network ("WAN"), a decentralized network, a cloud-based network and/or any other suitable network. The classical computing platform may be a computing system operating using binary digits and/or bits.

The first encryption scheme may be an advanced encryption standard ("AES") encryption scheme, a triple data encryption standard ("TDES") scheme, Rivest Sahmir Adleman ("RSA") encryption scheme, a Blowfish encryption scheme, a Twofish encryption scheme, a format preserving encryption ("FPE") scheme, an elliptic curve cryptography ("EEC") encryption scheme and/or any other suitable encryption scheme.

The methods may include storing the dataset in a memory. The dataset may be stored in a first location within the memory. The memory may be in electronic communication with the computing platform. The memory may be a random-access memory ("RAM"), a read-only memory ("ROM"), a flash memory, a cache memory, a database, a cloud-based memory and/or any other suitable memory.

The methods may include continually executing an alternating encryption scheme. The alternating encryption scheme may be executed using a quantum randomizing engine. The quantum randomizing engine may be executed on a quantum computing platform.

The quantum computing platform may be in electronic communication with the classical computing platform. The quantum computing platform may include a quantum processor. The quantum processor may operate using quantum bits ("qubits"). The quantum computing platform may include cooling hardware. The cooling hardware may be used to maintain the qubits within a few thousandths of a degree of absolute zero (kelvin). The qubits may be cooled to eliminate thermal noise and vibrations, which may destroy the information contained in the qubits.

The quantum randomizing engine may randomly select a time at which to replace the first encryption scheme. The time may be a specific minute, hour, day, month and/or any other specific time. At the selected time the quantum randomizing engine may randomly select a second encryption scheme. The second encryption scheme may be selected from a plurality of encryption schemes. The second encryption scheme may be different from the first encryption scheme. The second encryption scheme may be an AES encryption scheme, a TDES encryption scheme, an RSA encryption scheme, a Blowfish encryption scheme, a Twofish encryption scheme, an FPE encryption scheme, an EEC encryption scheme and/or any other suitable encryption scheme.

The quantum randomizing engine may transmit the randomly selected second encryption scheme to the encryption engine. In response to receiving the second encryption scheme, the encryption engine may replace the first encryption scheme with the second encryption scheme.

The methods may include monitoring the dataset. The methods may include using a monitoring engine to monitor the dataset. The monitoring engine may monitor the dataset in the first location in the memory. The monitoring engine may be executed on the classical computing platform.

The methods may include detecting an attempted breach of the first encryption scheme. The methods may include detecting an attempted breach of the dataset. The attempted breach may be detected via the monitoring engine. The attempted breach may be executed by a malicious actor. The malicious actor may execute the attempted breach in order to gain access to the dataset. The attempted breach may include an attempt to decrypt the dataset. The attempted breach may include an attempt to decrypt the dataset in order to gain access to the data included in the dataset. The attempted breach may include hacks, code manipulations, malware attacks, viruses, malicious codes and/or any other suitable breach strategies.

In response to detecting the attempted breach, methods may include pausing the alternating encryption scheme. In response to pausing the alternating encryption scheme, an artificial intelligence ("AI") engine may create a decoy dataset. The AI engine may be executed on the computing platform.

The AI engine may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI engine may update the progressive learning algorithms based on the generated outputs curated/retrieved from the analyzed correlations and patterns.

The AI engine may include machine learning algorithms. Machine learning algorithms may enable the AI engine to learn from experience without specific instructional programming. The AI engine may include deep learning algorithms. Deep learning algorithms may utilize neural networks. Neural networks may use interconnected nodes or neurons in a layered structure to analyze data and generate outputs.

The decoy dataset may include a second dataset that has one or more characteristics in common with the dataset. For example, the decoy dataset may be the same size as the dataset. The data included in the decoy dataset may not be the same data as data included in the dataset. The decoy dataset may include randomized sample data. The decoy dataset may not include personally identifiable information ("PII") private and/or confidential data. The decoy dataset may include public or non-private data. The decoy dataset may include artificially generated data.

The methods may include replacing the dataset with the decoy dataset. The AI engine may replace the dataset with the decoy dataset. The dataset may be replaced with the decoy dataset without changing the first encryption scheme. The malicious actor directing and/or executing the attempted breach may be unable to detect that the dataset was replaced by the decoy dataset.

The methods may include re-encrypting the dataset. The dataset may be re-encrypted using the encryption engine. Re-encrypting the dataset may include decrypting the dataset. The decrypted dataset may be re-encrypted with a third encryption scheme. The third encryption scheme may be randomly selected from the plurality of encryption schemes. The third encryption scheme may be randomly selected using the quantum randomizing engine. The third encryption scheme may be a stronger encryption scheme than the first and second encryption schemes. The third encryption scheme may be a more complex encryption scheme than the first and second encryption schemes. The third encryption scheme may be less vulnerable to an attempted breach than the first and second encryption schemes.

The third encryption scheme may be selected from a plurality of encryption schemes. The third encryption scheme may be different from the first encryption scheme. The third encryption scheme may be an AES encryption scheme, a TDES encryption scheme, an RSA encryption scheme, a Blowfish encryption scheme, a Twofish encryption scheme, an FPE encryption scheme, an EEC encryption scheme and/or any other suitable encryption scheme.

For example, when the first encryption scheme and the second encryption scheme include a 128-bit AES encryption, the third encryption scheme may include a 192-bit AES encryption. When the first encryption scheme and the second encryption scheme include a 192-bit AES encryption, the third encryption scheme may include a 256-bit AES encryption. The third encryption scheme may include any other suitable more advanced encryption scheme.

After being re-encrypted with the third encryption scheme, the dataset may be stored in a second location in the memory. The second location may be a different location from the first location.

In other embodiments, re-encrypting the dataset with the third encryption scheme may include segmenting the dataset into a plurality of data segments. The encryption engine may encrypt each data segment with a different encryption scheme selected from the plurality of encryption schemes. Each of the data segments may be stored in a different location within the memory.

The methods may include monitoring the attempted breach. Because the dataset was replaced with the decoy dataset, the monitoring engine may monitor the attempted breach without exposing data included in the dataset. The malicious actor may be unaware that the dataset was replaced by the decoy dataset and may therefore continue to attempt to breach the first encryption scheme. As the malicious actor tries to breach the first encryption scheme, the monitoring engine may monitor the malicious actor's actions.

The methods may include identifying, through the monitoring, a plurality of characteristics characterizing the attempted breach. Characteristics characterizing the attempted breach may include specific codes used to try and breach the encryption, patterns identified from the specific codes, points of attack through which the attempted breach is attempted, signatures left by the malicious actor executing the breach and/or any other suitable characteristics.

Based on the plurality of characteristics, methods may include identifying access points within the computing platform that are more vulnerable to attempted breaches. Methods may include identifying the access points using the AI engine together with a quantum optimization engine. The quantum optimization engine may be executed on the quantum computing platform.

The AI engine may identify a plurality of access points. The quantum optimization engine may assign a score to each of the plurality of identified access points. The score may reflect a likelihood of each identified access point being used in an attempted breach. A higher score may indicate a greater likelihood that the access point will be vulnerable in a future attempted breach. A lower score may indicate a smaller likelihood that the access point will be vulnerable in a future attempted breach. The AI engine may select a group of access points that are assigned a score greater than and/or equal to a threshold score. The threshold score may be a minimum score that corresponds to access points that are identified as having a higher level of vulnerability in future attempted breaches.

The access points may include at least one network connection, firewall, computing device connection, internet gateway/router or any other suitable access point.

The methods may include securing the access points that are assigned a score greater/equal to the threshold value. The securing may include adding an additional layer of encryption around the access points that are assigned a score greater than and/or equal to the threshold score. The securing may include increasing monitoring around the access points that are assigned a score greater than and/or equal to the threshold score. The securing may include performing any other suitable security measures around the access points that are assigned a score greater than and/or equal to the threshold score.

The methods may include resuming the alternating encryption scheme after re-encrypting the dataset with the third encryption scheme.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Figure 1:
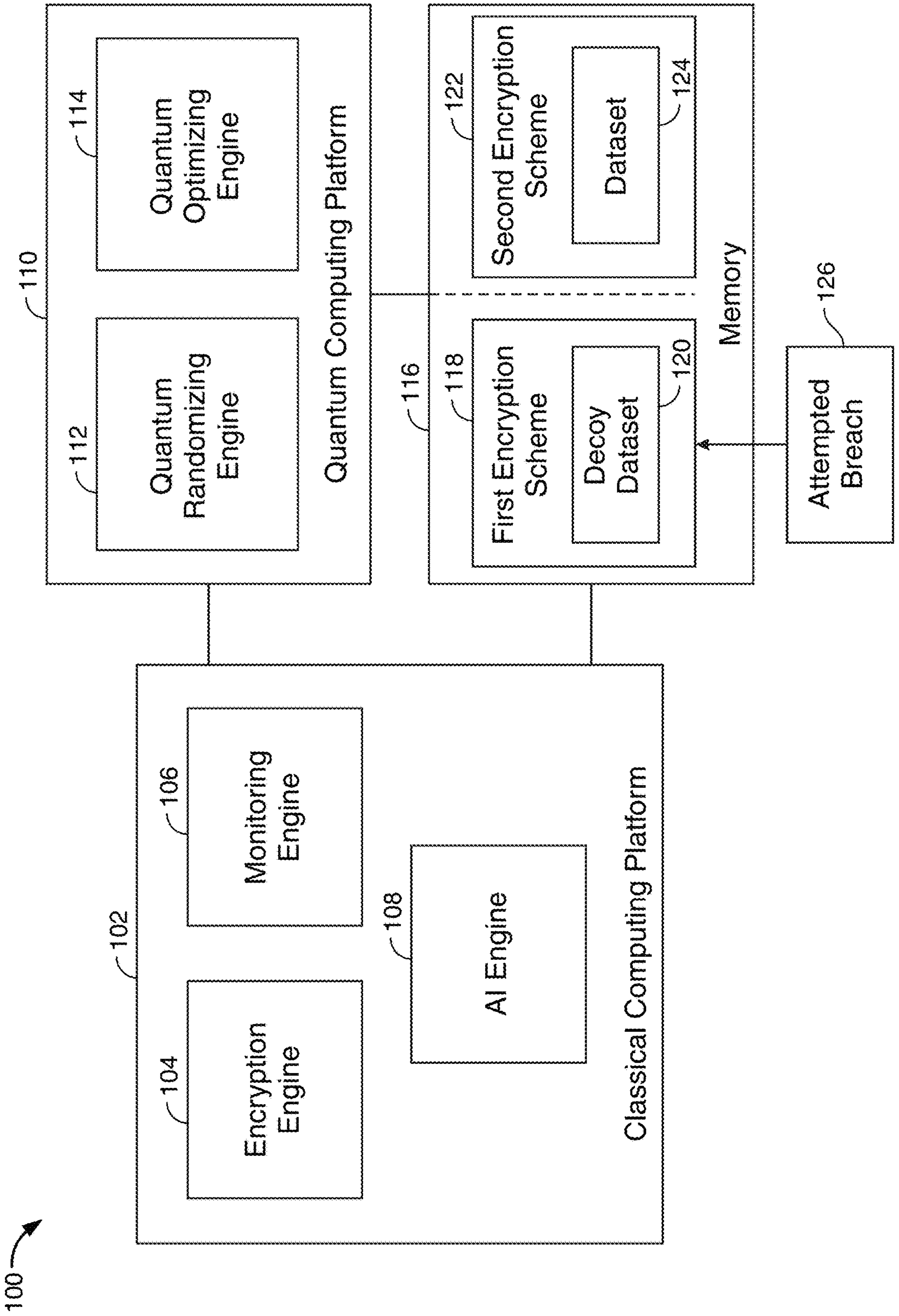
FIG. 1 shows an illustrative diagram in accordance with principles of the disclosure.

Systems, apparatus and methods for dynamic data encryption.

The apparatus may leverage artificial intelligence. The apparatus may leverage quantum computing.

The apparatus may include a computing platform. The computing platform may include a classical computing platform. The classical computing platform may include a network of one or more computing devices. Computing devices may include desktop computers, laptops, smartphones, tablets, mainframe computers, supercomputers, minicomputers and/or any other suitable computing devices. The network may include an edge network, a local area network ("LAN"), a wide area network ("WAN"), a decentralized network, a cloud-based network and/or any other suitable network. The classical computing platform may be a computing system operating using binary digits and/or bits.

The computing platform may be in electronic communication with in a memory. The memory may be a random-access memory ("RAM"), a read-only memory ("ROM"), a flash memory, a cache memory, a database, a cloud-based memory and/or any other suitable memory.

The computing platform may be in electronic communication with a quantum computing platform. The quantum computing platform may include a quantum processor. The quantum processor may operate using quantum bits ("qubits"). The quantum computing platform may include cooling hardware. The cooling hardware may be used to maintain the qubits within a few thousandths of a degree of absolute zero (kelvin). The qubits may be cooled to eliminate thermal noise and vibrations, which may destroy the information included in the qubits.

The apparatus may include an encryption engine. The encryption engine may be executed on the computing platform. The encryption engine may encrypt a dataset. The encryption may encrypt the dataset using a first encryption scheme.

The first encryption scheme may be an advanced encryption standard ("AES") encryption scheme, a triple data encryption standard ("TDES") scheme, Rivest Sahmir Adleman ("RSA") encryption scheme, a Blowfish encryption scheme, a Twofish encryption scheme, a format preserving encryption ("FPE") scheme, an elliptic curve cryptography ("EEC") encryption scheme and/or any other suitable encryption scheme.

The encrypted dataset may be stored in a first location within the memory.

The apparatus may include a quantum randomizing engine. The quantum randomizing engine may be executed on the quantum computing platform. The quantum randomizing engine may continually execute an alternating encryption scheme. The quantum randomizing engine together with the classical computing platform may continually execute an alternating encryption scheme.

The quantum randomizing engine may randomly select a time at which to replace the first encryption scheme. The time may be a specific minute, hour, day, month and/or any other specific time. At the selected time the quantum randomizing engine may randomly select a second encryption scheme. The second encryption scheme may be selected from a plurality of encryption schemes. The second encryption scheme may be different from the first encryption scheme. The second encryption scheme may be an AES encryption scheme, a TDES encryption scheme, an RSA encryption scheme, a Blowfish encryption scheme, a Twofish encryption scheme, an FPE encryption scheme, an EEC encryption scheme and/or any other suitable encryption scheme.

The quantum randomizing engine may transmit the randomly selected second encryption scheme to the encryption engine. In response to receiving the second encryption scheme, the encryption engine may replace the first encryption scheme with the second encryption scheme.

The apparatus may include a monitoring engine. The monitoring engine may be executed on the classical computing platform. The monitoring engine may monitor the dataset. The monitoring engine may monitor the dataset in the first location in the memory.

The monitoring engine may detect an attempted breach of the first encryption scheme. The monitoring engine may detect an attempted breach of the dataset. The attempted breach may be executed by a malicious actor. The malicious actor may attempt a breach in order to gain access to the dataset. The attempted breach may include an attempt to decrypt the dataset. The attempted breach may include an attempt to decrypt the dataset in order to gain access to the data included dataset. The attempted breach may include hacks, code manipulations, malware attacks, viruses, malicious codes and/or any other suitable breach strategies.

In response to detecting the attempted breach, the quantum randomizing engine together with the classical computing platform may pause the alternating encryption scheme.

The apparatus may include an artificial intelligence ("AI") engine. The AI engine may be executed on the computing platform. In response to pausing the alternating encryption scheme, the AI engine may generate a decoy dataset.

The AI engine may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI engine may update the progressive learning algorithms based on the generated outputs curated/retrieved from the analyzed correlations and patterns.

The AI engine may include machine learning algorithms. Machine learning algorithms may enable the AI engine to learn from experience without specific instructional programming. The AI engine may include deep learning algorithms. Deep learning algorithms may utilize neural networks. Neural networks may use interconnected nodes or neurons in a layered structure to analyze data and generate outputs.

The decoy dataset may include a second dataset that has one or more characteristics in common with the dataset. For example, the decoy dataset may be the same size as the dataset. The data included in the decoy dataset may not be the same data as data included in the dataset. The decoy dataset may include randomized sample data. The decoy dataset may not include personally identifiable information ("PII"), private and/or confidential data. The decoy dataset may include public or non-private data. The decoy dataset may include artificially generated data.

The AI engine may replace the dataset with the decoy dataset. The dataset may be replaced with the decoy dataset without changing the first encryption scheme. The malicious actor executing the attempted breach may be unable to detect that the dataset was replaced by the decoy dataset.

The encryption engine may re-encrypt the dataset. Re-encrypting the dataset may first include decrypting the dataset. The decrypted dataset may be re-encrypted with a third encryption scheme. The third encryption scheme may be randomly selected from the plurality of encryption schemes. The third encryption scheme may be randomly selected using the quantum randomizing engine. The third encryption scheme may be a stronger encryption scheme than the first and second encryption schemes. The third encryption scheme may be a more complex encryption scheme than the first and second encryption schemes. The third encryption scheme may be less vulnerable to an attempted breach than the first and second encryption schemes.

The third encryption scheme may be selected from a plurality of encryption schemes. The third encryption scheme may be different from the first encryption scheme. The third encryption scheme may be an AES encryption scheme, a TDES encryption scheme, an RSA encryption scheme, a Blowfish encryption scheme, a Twofish encryption scheme, an FPE encryption scheme, an EEC encryption scheme and/or any other suitable encryption scheme.

For example, when the first encryption scheme and the second encryption scheme include a 128-bit AES encryption, the third encryption scheme may include a 192-bit AES encryption. When the first encryption scheme and the second encryption scheme include a 192-bit AES encryption, the third encryption scheme may include a 256-bit AES encryption. The third encryption may include any other suitable more advanced encryption scheme.

After being re-encrypted with the third encryption scheme, the dataset may be stored in a second location in the memory. The second location may be a different location from the first location.

In other embodiments, re-encrypting the dataset with the third encryption scheme may include segmenting the dataset into a plurality of data segments. The encryption engine may encrypt each data segment with a different encryption scheme selected from the plurality of encryption schemes. Each of the data segments may be stored in a different location within the memory.

The monitoring engine may monitor the attempted breach. Because the dataset was replaced with the decoy dataset, the monitoring engine may monitor the attempted breach without exposing data included in the dataset. The malicious actor may be unaware that the dataset was replaced by the decoy dataset and may therefore continue to attempt to breach the first encryption scheme. As the malicious actor attempts to breach the first encryption scheme, the monitoring engine may monitor the malicious actor's actions.

The apparatus may include a quantum optimization engine. The quantum optimization engine may be executed on the quantum computing platform.

The AI engine and the quantum optimization engine, based on the monitoring, may identify plurality of characteristics characterizing the attempted breach. Characteristics characterizing the breach may include specific codes used to try and breach the encryption, patterns identified from the specific codes, points of attack at/through which the attempted breach is attempted, signatures left by the malicious actor executing the breach and/or any other suitable characteristics.

Based on the plurality of characteristics, the AI engine and the quantum optimization engine may identify access points within the computing platform that are more vulnerable to attempted breaches. The AI engine may identify a plurality of access points. The quantum optimization engine may assign a score to each of the plurality of identified access points. The score may reflect a likelihood of the identified access points being used in an attempted breach. A higher score may indicate a greater likelihood that the access point will be vulnerable in a future attempted breach. A lower score may indicate a smaller likelihood that the access point will be vulnerable in a future attempted breach. The AI engine may select a group of access points that are assigned a score greater/equal to than a threshold score. The threshold score may be a minimum score that corresponds to access points that are identified as having a higher level of vulnerability in future attempted breaches.

The access points may include at least one network connection, firewall, computing device connection, internet gateway/router or any other suitable access point.

The encryption engine may secure the access points that are assigned a score greater than/or equal to the threshold value. The securing may include adding an additional layer of encryption around the access points that are assigned a score greater than/or equal to the threshold score. The securing may include increased monitoring around the access points that are assigned a score greater than/or equal to the threshold score. The securing may include any other suitable security measures around the access points that are assigned a score greater than/or equal to the threshold score.

The quantum randomizing engine together with the classical computing platform may resume the alternating encryption scheme after re-encrypting the dataset with the third encryption scheme.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative architecture of system 100. Classical computing platform 102 may be a computing system operating using binary digits and/or bits. Classical computing platform 102 may include a network of one or more computing devices. Classical computing platform 102 may include encryption engine 104, monitoring engine 106 and artificial intelligence ("AI") engine 108 and/or any other suitable components.

Classical computing platform 102 may be in electronic communication with memory 116. Memory 116 may include be a random-access memory ("RAM"), a read-only memory ("ROM"), a flash memory, a cache memory, a database, a cloud-based memory and/or any other suitable memory.

Classical computing platform 102 may be in electronic communication with quantum computing platform 110. Quantum computing platform 110 may be a computing operating system using quantum bits ("qubits"). Quantum computing platform 110 may include quantum processors, cooling hardware and/or any other suitable quantum computing components. Quantum computing platform 110 may include quantum randomizing engine 112 and quantum optimizing engine 114.

Encryption engine 104 may encrypt dataset 124 with first encryption scheme 118. Computing platform 102 may store dataset 124 in a first location within memory 116.

Monitoring engine 106 may monitor dataset 124. In response to detecting attempted breach 126 on first encryption scheme 118, AI engine 108 may generate decoy dataset 120. In response to detecting attempted breach 126 on dataset 124, AI engine 108 may generate decoy dataset 120. Decoy dataset 120 may appear like dataset 124. Decoy dataset 120 may include one or more characteristics in common with dataset 124. Decoy dataset 120 may not include the same data as dataset 124. Decoy dataset 120 may include artificially generated data. AI engine 108 may replace decoy data 120 in first encryption scheme 118.

A malicious actor executing attempted breach 126 may not be able to detect that dataset 124 was replaced by decoy dataset 120. The malicious actor, therefore, may continue to attempt to breach first encryption scheme 118.

After replacing dataset 124 with decoy dataset 120, dataset 124 may be decrypted. After being decrypted, dataset 124 may be re-encrypted with second encryption scheme 122. Dataset 124 may be re-encrypted with second encryption scheme 122. Quantum randomizing engine 112 and quantum optimizing engine 114 may select second encryption scheme 122. Second encryption scheme 122 may be a stronger encryption scheme than first encryption scheme 118. Once dataset 124 is re-encrypted with second encryption scheme 122, second dataset 124 may be stored in a second location within memory 116. The second location may be different than the first location.

As the malicious actor tries to access decoy dataset 120, monitoring engine 106 may monitor attempted breach 126. Monitoring engine 106 may identify strategies implemented by the malicious actor to attempt the breach. Based on knowledge gleaned from the strategies, monitoring engine 106 may use AI engine 108 and quantum optimizing engine 114 to identify vulnerabilities within system 100 that may be susceptible to attempted breach 126. AI engine 108 and quantum optimizing engine 114 may determine solutions to secure the vulnerabilities identified within system 100.

Figure 2:
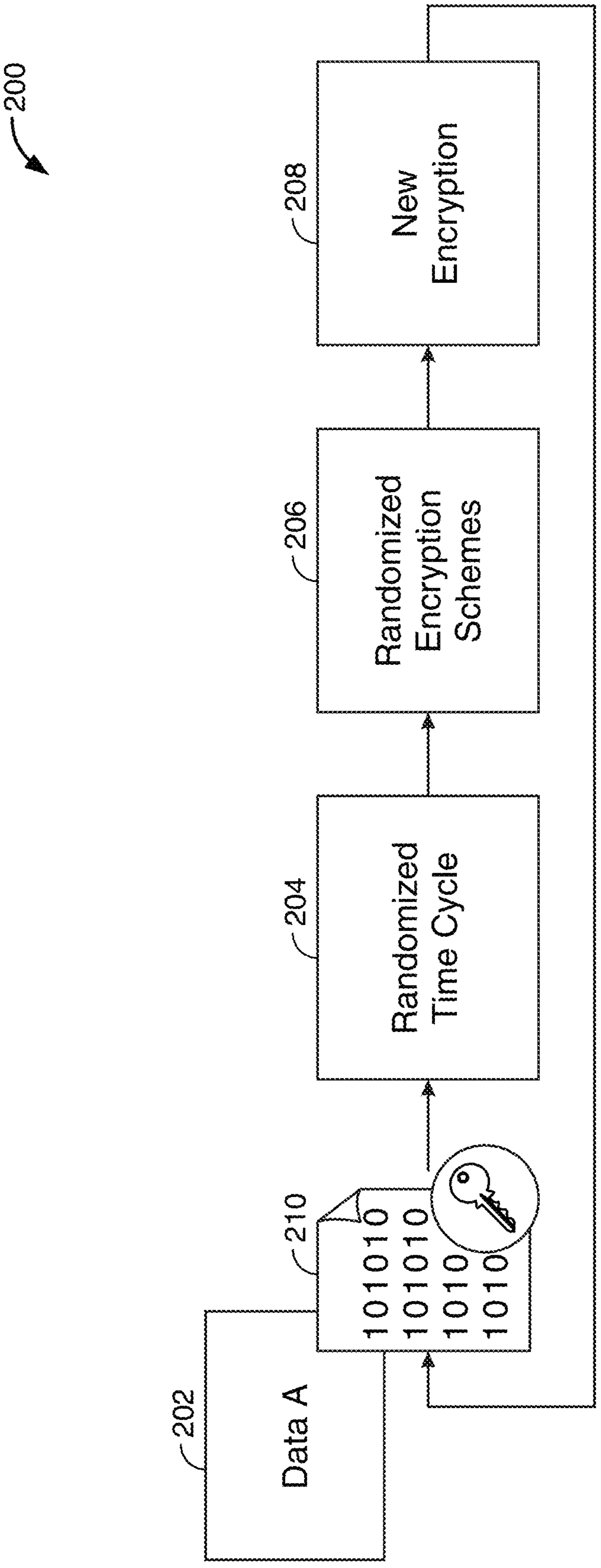
FIG. 2 shows another illustrative diagram in accordance with principles of the disclosure.

FIG. 2 shows illustrative alternating encryption scheme 200. Alternating scheme 200 may be executed as part of system 100. Dataset 202 may be encrypted with encryption scheme 210. Dataset 202 may include one or more features in common with dataset 124. Encryption scheme 210 may have one or more features in common with one or more of first encryption scheme 118 and second encryption scheme 122.

Alternating encryption scheme 200 may include selecting a time at which to replace encryption scheme 210 using randomized time cycle 204. Randomized time cycle 204 may randomly select a time using quantum randomizing engine 112 (shown in FIG. 1). The time may include a specific minute, hour, day, month and/or any other specific time.

At the randomly selected time, alternating encryption scheme 200 may select an encryption scheme from randomized encryption schemes 206. Alternating encryption scheme 200 may select encryption scheme 208 from randomized encryption schemes 206 using quantum randomizing engine 112 (shown in FIG. 1).

After selecting encryption scheme 208, alternating encryption scheme 200 may re-encrypt dataset 202 with encryption scheme 208. Alternating encryption scheme 200 may re-encrypt dataset 202 with encryption scheme 208, using encryption engine 104 (shown in FIG. 1).

Alternating encryption scheme 200 may continually repeat the above-mentioned steps, as shown by the arrow between 208 and 210.

Figure 3:
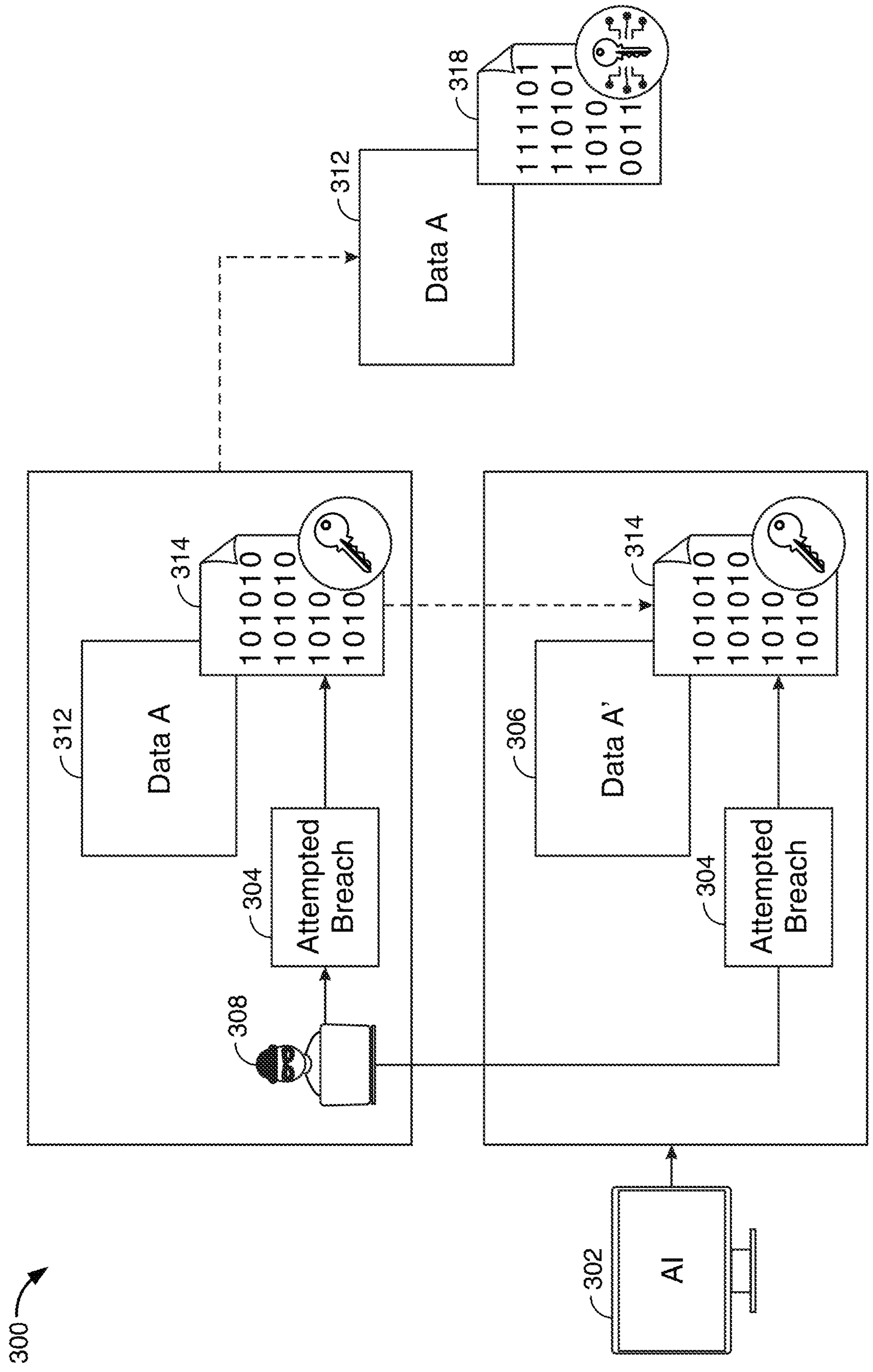
FIG. 3 shows yet another illustrative diagram in accordance with principles of the disclosure.

FIG. 3 shows dynamic encryption process 300. Dynamic encryption process 300 may be executed as part of system 100.

Dataset 312 may be encrypted with encryption scheme 314. Dataset 312 may have one or more features in common with dataset 124. Encryption scheme 314 may have one or more features in common with first encryption scheme 118.

In response to detecting attempted breach 304 on encryption scheme 314, AI engine 302 may generate decoy dataset 306. In response to detecting attempted breach 304 on dataset 312, AI engine 302 may generate decoy dataset 306. AI engine 302 may have one or more features in common with AI engine 108. Decoy dataset 306 may have one or more features in common with decoy dataset 120.

Malicious actor 308 may execute attempted breach 304. AI engine 302 may replace dataset 312 with decoy dataset 306. Malicious actor 308 may be unable to detect the replacement of dataset 312 with decoy dataset 306. Because malicious actor 308 may be unable to detect replacement of dataset 312 with decoy dataset 306, malicious actor 308 may continue using attempted breach 304 to try to break encryption scheme 314.

After replacing dataset 312 with decoy dataset 306, dataset 312 may be re-encrypted. Dataset 312 may be re-encrypted using encryption engine 104 (shown in FIG. 1). Dataset 312 may be re-encrypted with encryption scheme 318. Encryption scheme may include one or more features in common with second encryption scheme 122.

Figure 4:
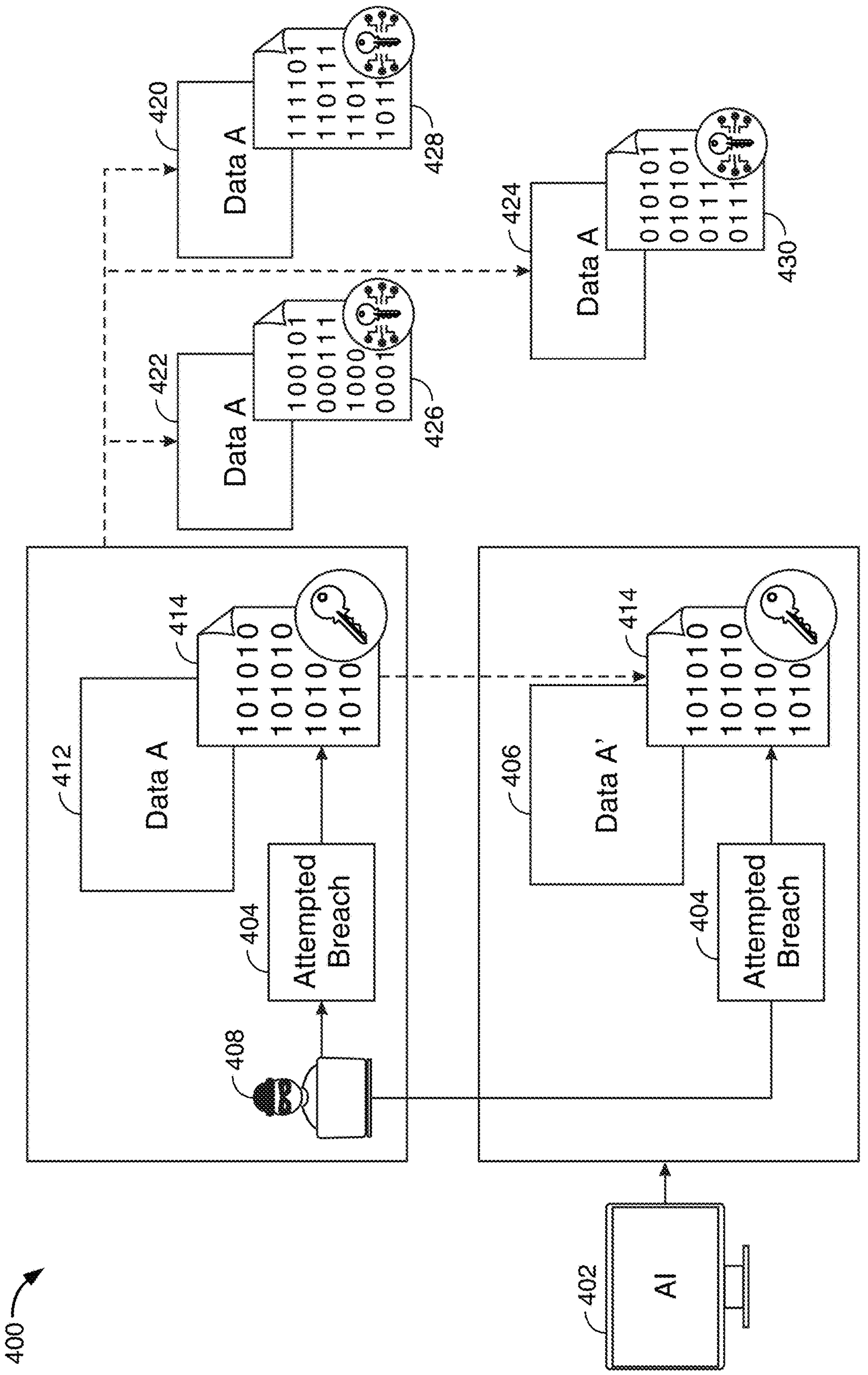
FIG. 4 shows yet another illustrative diagram in accordance with principles of the disclosure.

FIG. 4 shows dynamic encryption process 400. Dynamic encryption process 400 may include be executed as part of system 100.

Dataset 412 may be encrypted with encryption scheme 414. Dataset 412 may have one or more features in common with dataset 124 and encryption scheme 414 may have one or more features in common with first encryption scheme 118.

In response to detecting attempted breach 404 on encryption scheme 414, AI engine 402 may generate decoy dataset 406. In response to detecting attempted breach 404 on dataset 412, AI engine 402 may generate decoy dataset 406. AI engine 402 may have one or more features in common with AI engine 108. Decoy dataset 406 may have one or more features in common with decoy dataset 120.

Malicious actor 408 may execute attempted breach 404. AI engine 402 may replace dataset 412 with decoy dataset 406. Malicious actor 408 may be unable to detect the replacement of dataset 412 with decoy dataset 406. Because malicious actor 408 may be unable to detect replacement of dataset 412 with decoy dataset 406, malicious actor 408 may continue using attempted breach 404 to attempt to break encryption scheme 414.

After replacing dataset 412 with decoy dataset 406, dataset 412 may be segmented into data segment 420, data segment 422 and data segment 424. Each one of data segment 420, data segment 422 and data segment 424 may be re-encrypted using encryption engine 104 (shown in FIG. 1). Data segment 420 may be re-encrypted with encryption scheme 428. Data segment 422 may be re-encrypted with encryption scheme 426. Data segment 424 may be re-encrypted with encryption scheme 430. Each of encryption scheme 426, encryption scheme 428 and encryption scheme 430 may be different encryption schemes.

Figure 5:
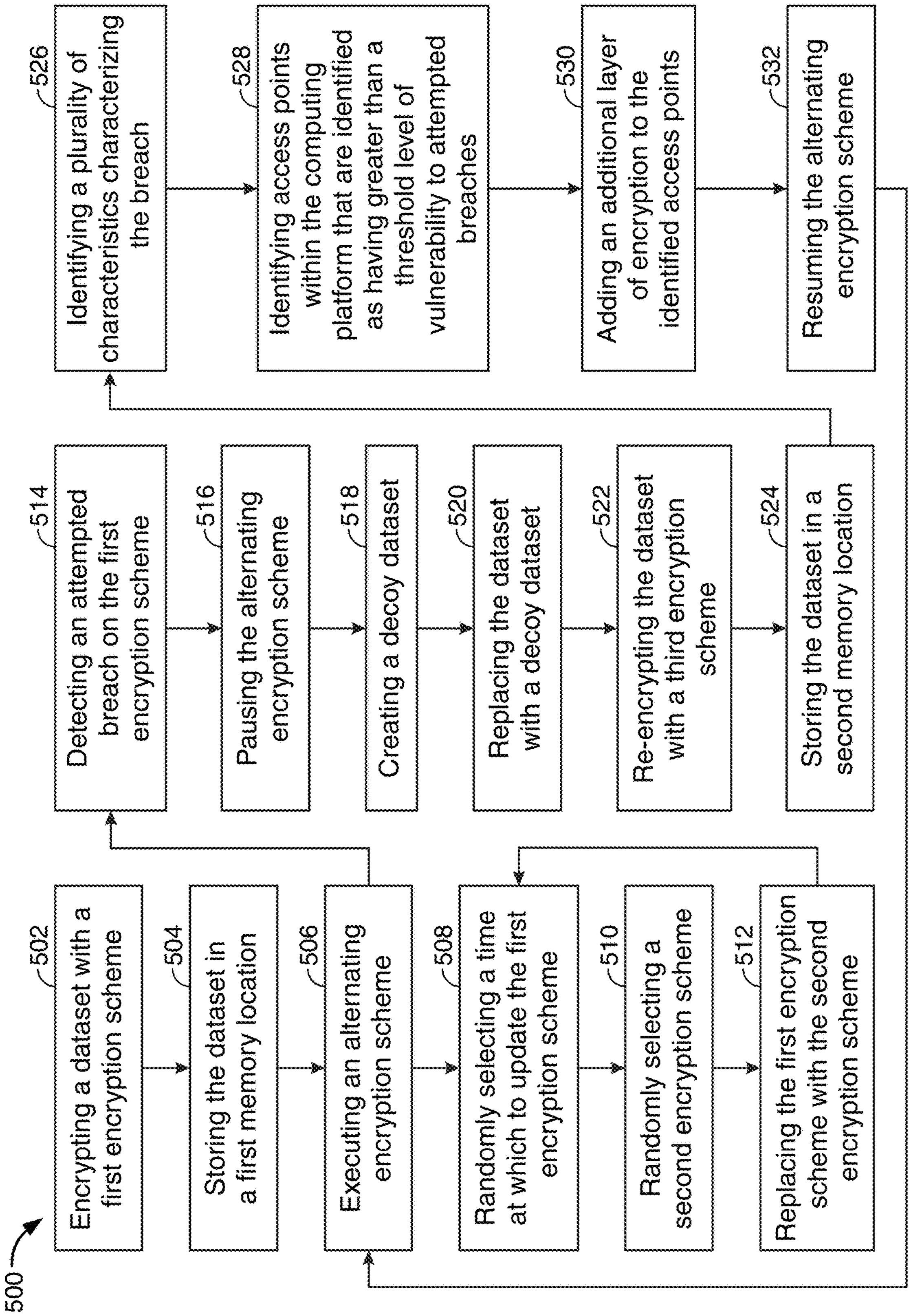
FIG. 5 shows an illustrative flow chart in accordance with principles of the disclosure.

FIG. 5 shows illustration of dynamic encryption process 500. Dynamic encryption process 500 may include one or more features in common with one or more of system 100, alternating encryption scheme 200, dynamic encryption process 300 and dynamic encryption process 400.

At step 502, a dataset may be encrypted with a first encryption scheme. The encrypted dataset may be stored in a first memory location at step 504. At step 506, an alternating encryption scheme may be executed.

The alternating encryption scheme may include randomly selecting a time at which to replace the first encryption scheme as shown at step 508. The alternating encryption scheme may include randomly selecting a second encryption scheme, as shown at step 510. The alternating encryption may include replacing the first encryption scheme, as shown at step 512. The alternating encryption scheme may continue in a continual loop.

At step 514, an attempted breach of the first encryption scheme may be detected. At step 514, an attempted breach of the dataset may be detected. After detecting the attempted breach, at step 516, the alternating encryption scheme may be paused. At step 518 a decoy dataset may be created. The decoy dataset may replace the dataset at step 520.

At step 522, the dataset may be re-encrypted with a third encryption scheme. At step 524, the dataset may be stored in a second memory location.

At step 526, a plurality of characteristics characterizing the breach may be identified. Based on the identified characteristics, access points within the computing platform that have greater than a threshold level of vulnerability to attempted breaches may be identified at step 528. At step 530, an additional layer of encryption may be added to the identified access points. At step 532, the alternating encryption scheme may be resumed.

Figure 6:
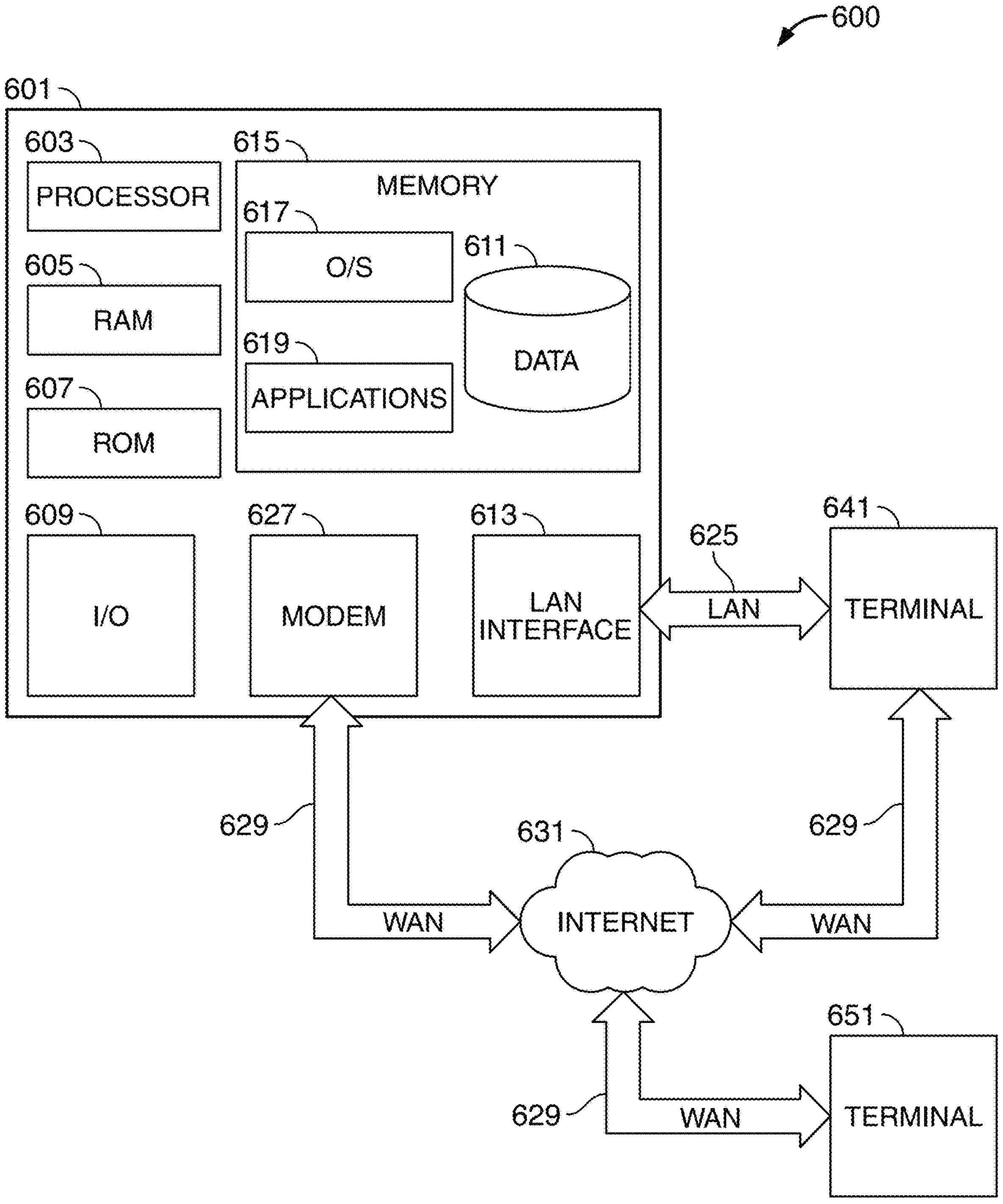
FIG. 6 shows yet another illustrative diagram in accordance with principles of the disclosure.

FIG. 6 shows an illustrative block diagram of system 600 that includes computer 601. Computer 601 may alternatively be referred to herein as an "engine," "server," or a "computing device." Computer 601 may be a workstation, desktop, laptop, tablet, smartphone and/or any other suitable computing device. Elements of system 600, including computer 601, may be used to implement various aspects of the systems and methods disclosed herein. Each of the systems, methods and algorithms illustrated above/below may include some or all of the elements and apparatus of system 600.

Computer 601 may include processor 603 for controlling the operation of the device and its associated components, and may include RAM 605, ROM 607, input/output ("I/O") 609, and a non-transitory or non-volatile memory 615. Machine-readable memory may be configured to store information in machine-readable data structures. Processor 603 may also execute software running on the computer. Other components commonly used for computers, such as EEPROM or flash memory or any other suitable components, may also be part of computer 601.

Memory 615 may include any suitable permanent storage technology, such as a hard drive. Memory 615 may store software including the operating system 617 and application program(s) 619 together with any data 611 needed for the operation of the system 600. Memory 615 may also store videos, text and/or audio assistance files. The data stored in memory 615 may also be stored in cache memory and/or any other suitable memory.

I/O module 609 may include connectivity to a microphone, keyboard, touch screen, mouse and/or stylus through which input may be provided into computer 601. The input may include input relating to cursor movement. The input/output module may also include one or more speakers for providing audio output and a video display device for providing textual, audio, audiovisual and/or graphical output. The input and output may be related to computer application functionality.

System 600 may be connected to other systems via a local area network ("LAN") interface 613. System 600 may operate in a networked environment supporting connections to one or more remote computers, such as terminals 641 and 651. Terminals 641 and 651 may be personal computers or servers that include many or all of the elements described above relative to system 600. The network connections depicted in FIG. 6 include LAN 625 and a wide area network ("WAN") 629 but may also include other networks. When used in a LAN networking environment, computer 601 may connect to LAN 625 through LAN interface 613 or an adapter. When used in a WAN networking environment, computer 601 may include modem 627 or other means for establishing communications over WAN 629, such as Internet 631.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory and/or any other suitable memory.

Additionally, application program(s) 619, which may be used by computer 601, may include computer executable instructions for invoking functionality related to communication, such as e-mail, Short Message Service ("SMS"), and voice input and speech recognition applications. Application program(s) 619 (which may be alternatively referred to herein as "plugins," "applications," or "apps") may include computer executable instructions for invoking functionality related to performing various tasks. Application program(s) 619 may utilize one or more algorithms that process received executable instructions, perform power management routines or other suitable tasks.

The invention may be described in the context of computer-executable instructions, such as application(s) 619, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 601 and/or terminals 641 and 651 may also include various other components, such as a battery, speaker and/or antennas (not shown). Components of computer system 601 may be linked by a system bus, wirelessly or by other suitable interconnections. Components of computer system 601 may be present on one or more circuit boards. In some embodiments, the components may be integrated into a single chip. The chip may be silicon-based.

Terminal 641 and/or terminal 651 may be portable devices such as a laptop, cell phone, tablet, smartphone or any other computing system for receiving, storing, transmitting and/or displaying relevant information. Terminal 641 and/or terminal 651 may be one or more user devices. Terminals 641 and 651 may be identical to system 600 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 7:
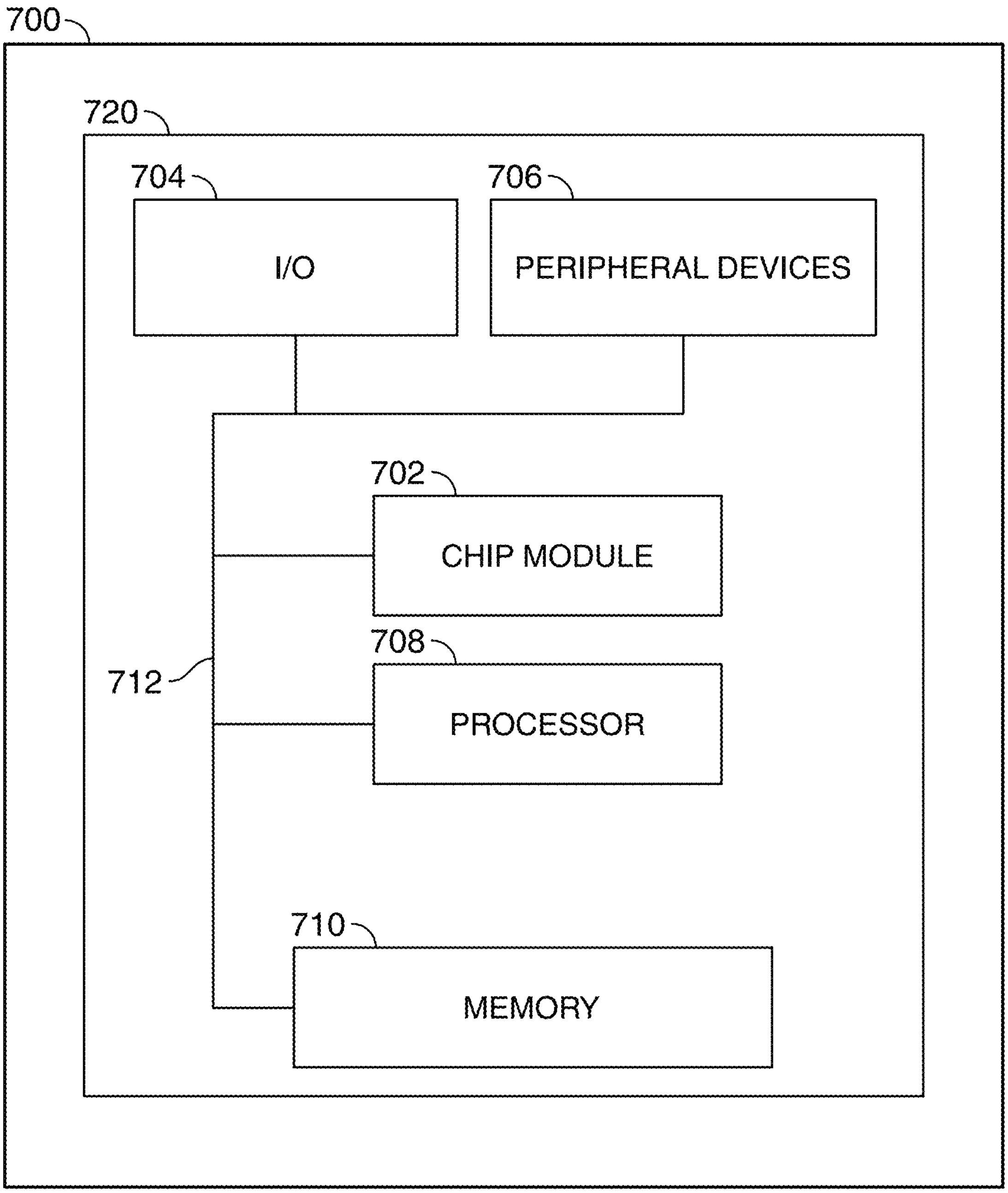
FIG. 7 shows yet another illustrative diagram in accordance with principles of the disclosure.

FIG. 7 shows illustrative apparatus 700 that may be configured in accordance with the principles of the disclosure. Apparatus 700 may be a computing device. Apparatus 700 may include one or more features of the apparatus shown in FIG. 6. Apparatus 700 may include chip module 702, which may include one or more integrated circuits, and which may include logic configured to perform any suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may compute data structural information and structural parameters of the data; and machine-readable memory 710.

Machine-readable memory 710 may be configured to store in machine-readable data structures: machine executable instructions, (which may be alternatively referred to herein as "computer instructions" or "computer code"), applications such as applications 719, signals, and/or any other suitable information or data structures.

Components 702, 704, 706, 708, and 710 may be coupled together by a system bus or other interconnections 712 and may be present on one or more circuit boards such as circuit board 720. In some embodiments, the components may be integrated into a single chip. The chip may be silicon-based.

Figure 8:
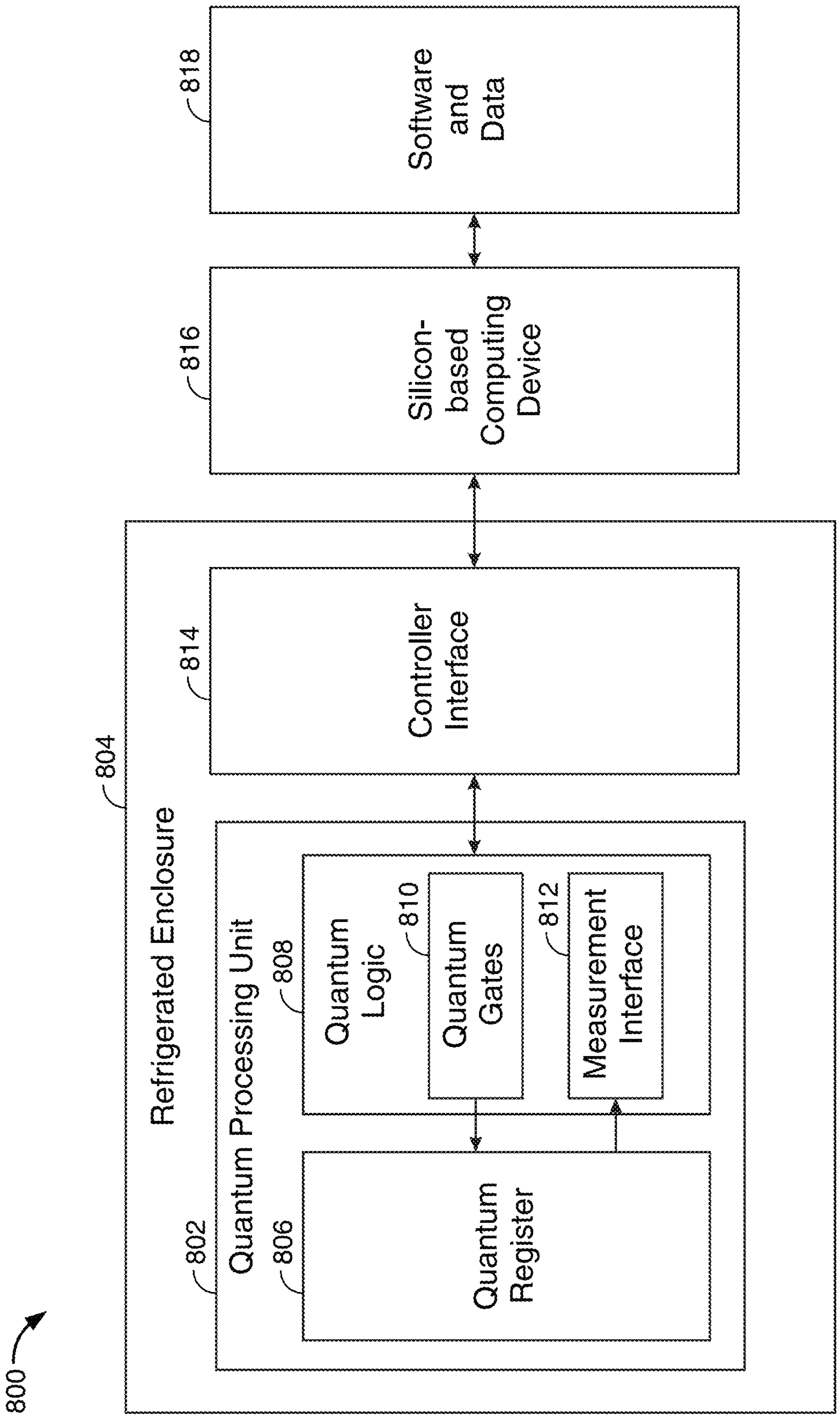
FIG. 8 shows yet another illustrative diagram in accordance with principles of the disclosure.

FIG. 8 shows illustrative block diagram of system 800. System 800 may include quantum processing unit 802. Quantum processing unit 802 may be a processing unit that uses quantum principles to perform tasks. Quantum processing unit 802 may include quantum register 806. Quantum processing unit 802 may include quantum logic 808. Quantum logic 808 may include quantum gates 810 and measurement interface 812.

Quantum register 806 may be comprised of qubits. Each qubit may have a state of either zero or one, like a classical bit. However, unlike a classical bit, a qubit may have a superposition state. The superposition state may be a state in which the qubit exists as all possible states simultaneously. In order to maintain the qubits in a superposed state, the qubits are preserved at close to absolute zero degrees (kelvin). Refrigerated enclosure 804 may maintain the qubits at close to absolute zero degrees (kelvin).

Quantum gates 810 may include quantum algorithms, such as algorithms based on amplitude amplification, algorithms based on the quantum Fourier transform, algorithms based on quantum walks and/or any other suitable quantum algorithms. Each algorithm may include a series of one or more quantum gates, such as but not limited to identity gates, Pauli gates, controlled gates, phase shift gates, Hadamard gates, swap gates and Toffoli gates. Measurement interface 812 may measure a state of each qubit after being processed by the algorithms included in quantum gates 810. The measured state of each qubit may be a finite state.

The measured state may be transmitted to controller interface 814. Controller interface 814 may enable information to be transmitted between quantum processing unit 802 and silicon-based computing device 816. The measured state may be transmitted to silicon-based computing device 816. Silicon-based computing device 816 may include software and data 818. Software and data 818 may be used to process the measured state that was transmitted from quantum processing unit 802. Silicon-based computing device 816 may transmit data included in software and data 818 to controller interface 814. Controller interface 814 may transmit the data to quantum processing unit 802 to be processed and analyzed.

Figure 9:
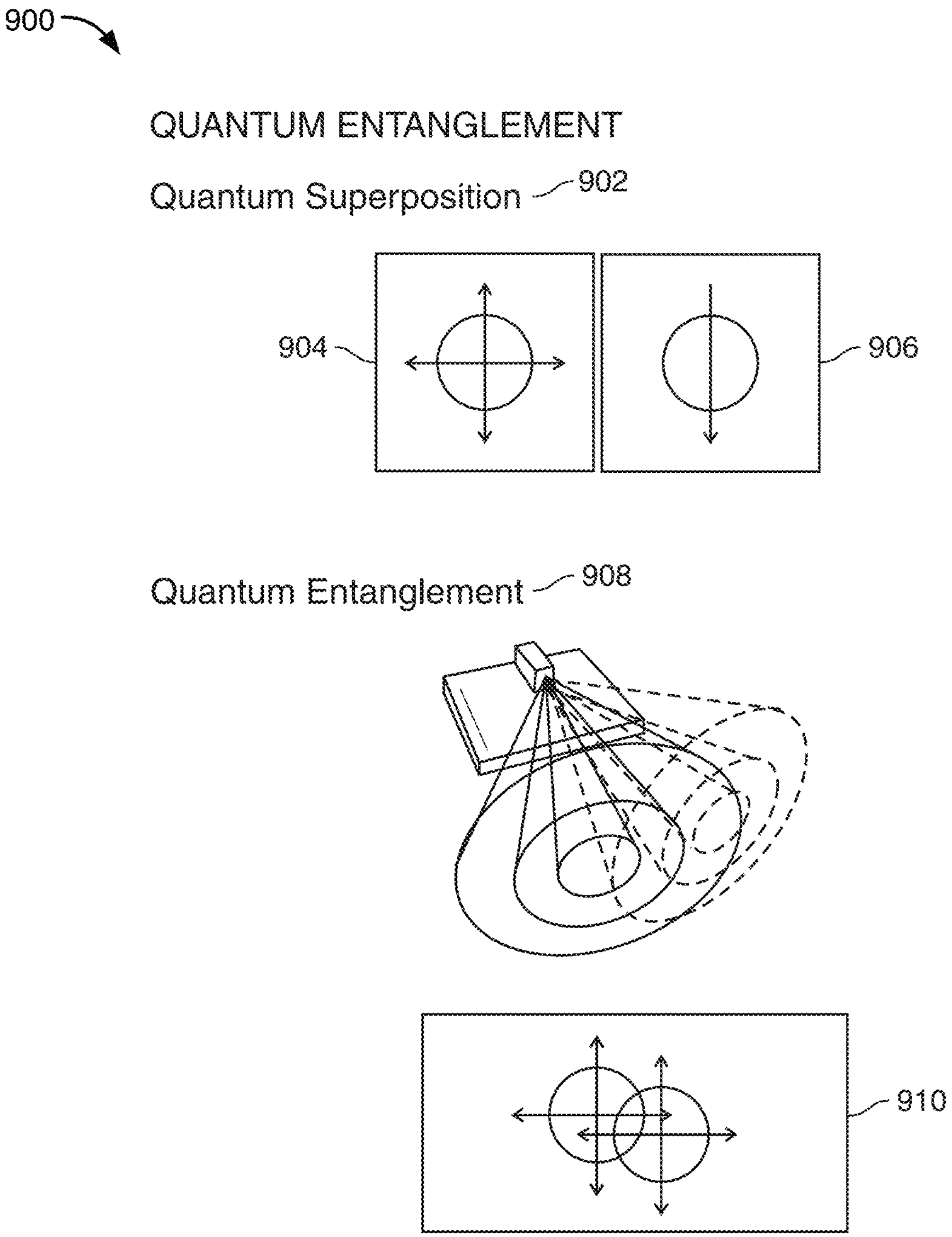
FIG. 9 shows yet another illustrative diagram in accordance with principles of the disclosure.

FIG. 9 shows illustrative diagram 900. Illustrative diagram 900 may have one or more features in common with system 800. Illustrative diagram 900 may include quantum superposition, as shown at 902. The rules of quantum physics state that an unobserved quantum particle, such as a photon, exists in all possible states simultaneously, as shown at 904. However, when observed or measured, the quantum particle collapses into one state, as shown at 906 (spin-down).

Quantum entanglement, shown at 908, may occur when two quantum particles become connected. A laser beam fired through a certain type of crystal can cause individual photons to be split into pairs of entangled photons. A pair of entangled particles may be shown at 910.

Thus, methods and apparatus for ALTERNATING ENCRYPTION SCHEMES are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for dynamically encrypting data leveraging artificial intelligence and quantum computing, the method comprising:

using an encryption engine executing on a computing platform, encrypting a dataset with a first encryption scheme;

storing the dataset in a first location in a memory that is in electronic communication with the computing platform;

continually executing an alternating encryption scheme, the executing using a quantum randomizing engine, the executing comprising:

randomly selecting a time at which to replace the first encryption scheme; and at the selected time, replacing the first encryption scheme with a second encryption scheme, the second encryption scheme being randomly selected from a plurality of encryption schemes;

using a monitoring engine executing on the computing platform, monitoring the dataset;

detecting, via the monitoring engine, an attempted breach of the first encryption scheme;

in response to detecting the attempted breach, pausing the alternating encryption scheme;

in response to pausing the alternating encryption scheme:

creating a decoy dataset using an artificial intelligence engine executing on the computing platform;

replacing the dataset with the decoy dataset without changing the first encryption scheme;

re-encrypting the dataset, using the encryption engine, with a third encryption scheme, the third encryption scheme being randomly selected from the plurality of encryption schemes;

storing the dataset in a second location in the memory, the second location being different from the first location;

identifying, through monitoring the attempted breach, a plurality of characteristics characterizing the attempted breach;

based on the plurality of characteristics identifying access points within the computing platform that are identified as having greater than a threshold level of vulnerability to attempted breaches, the identifying using the artificial intelligence engine together with a quantum optimization engine; and adding an additional layer of encryption to the identified access points; and after re-encrypting the dataset with the third encryption scheme resuming the alternating encryption scheme.

2. The method of claim 1 wherein:

the first encryption scheme and the second encryption scheme include a 28-bit advanced encryption standard ("AES") encryption; and the third encryption scheme includes a192-bit AES encryption.

3. The method of claim 1 wherein:

the first encryption scheme and the second encryption scheme include 192-bit advanced encryption standard ("AES") encryption; and the third encryption scheme includes a 256-bit AES encryption.

4. The method of claim 1 wherein the first encryption scheme is an advanced encryption standard ("AES") encryption, a triple data encryption standard ("TDES"), Rivest Sahmir Adleman ("RSA") encryption, a Blowfish encryption, a Twofish encryption, a format preserving encryption ("FPE") or an elliptic curve cryptography ("EEC") encryption.

5. The method of claim 1 wherein the second encryption scheme is an advanced encryption standard ("AES") encryption, a triple data encryption standard ("TDES"), Rivest Sahmir Adleman ("RSA") encryption, a Blowfish encryption, a Twofish encryption, a format preserving encryption ("FPE") or an elliptic curve cryptography ("EEC") encryption.

6. The method of claim 1 wherein the third encryption scheme is an advanced encryption standard ("AES") encryption, a triple data encryption standard ("TDES"), Rivest Sahmir Adleman ("RSA") encryption, a Blowfish encryption, a Twofish encryption, a format preserving encryption ("FPE") or an elliptic curve cryptography ("EEC") encryption.

7. The method of claim 1 wherein re-encrypting the dataset with the third encryption scheme further comprises:

segmenting the dataset into a plurality of data segments;

encrypting, using the encryption engine, each data segment with a different encryption scheme from the plurality of encryption schemes; and storing each data segment in a different location within the memory.

8. The method of claim 1 wherein the access points includes at least one network connection.

9. The method of claim 1 wherein:

the computing platform is a classical computing platform;

the quantum randomizing engine and the quantum optimization engine are executing on a quantum computing platform; and the quantum computing platform is in electronic communication with the classical computing platform.

10. The method of claim 1 wherein identifying the access points further comprises:

identifying, using the artificial intelligence engine, a plurality of access points;

assigning, using the quantum optimization engine, a score to each of the plurality of access points; and selecting, using the artificial intelligence engine, a group of access points that are assigned a score greater than/equal to a threshold score.

11. An apparatus for dynamic data encryption leveraging artificial intelligence and quantum computing, the apparatus comprising:

an encryption engine executing on a computing platform, the encryption engine configured to encrypt a dataset with a first encryption scheme;

a memory that is in electronic communication with the computing platform, the memory configured to store the dataset in a first location;

a quantum randomization engine configured to continually execute an alternating encryption scheme, the quantum randomization engine configured to:

randomly select a time at which to replace the first encryption scheme; and randomly select a second encryption scheme from a plurality of encryption schemes;

an artificial intelligence engine executing on the computing platform configured to replace the first encryption scheme with the second encryption scheme at the selected time; and a monitoring engine executing on the computing platform configured to:

monitor the dataset;

detect an attempted breach of the first encryption scheme;

wherein, in response to detecting the attempted breach:

the computing platform is configured to pause the alternating encryption scheme;

the artificial intelligence engine is configured to:

create a decoy dataset; and replace the dataset with the decoy dataset without changing the first encryption scheme;

the encryption engine is configured to re-encrypt the dataset with a third encryption scheme, the third encryption scheme being randomly selected from the plurality of encryption schemes;

the memory is configured to store the dataset in a second location, the second location being different from the first location;

the monitoring engine is configured to identify a plurality of characteristics characterizing the attempted breach;

the artificial intelligence engine together with a quantum optimization engine are configured to identify access points within the computing platform that are identified as having greater than a threshold level of vulnerability to attempted breaches, the access points being identified based on the plurality of characteristics;

the encryption engine is further configured to add an additional layer of encryption around the identified access points; and after re-encrypting the dataset with the third encryption scheme, the computing platform is further configured to resume the alternating encryption scheme.

12. The apparatus of claim 11 wherein:

the first encryption scheme and the second encryption scheme include a 28-bit advanced encryption standard ("AES") encryption; and the third encryption scheme includes a192-bit AES encryption.

13. The apparatus of claim 11 wherein:

the first encryption scheme and the second encryption scheme include 192-bit advanced encryption standard ("AES") encryption; and the third encryption scheme includes a 256-bit AES encryption.

14. The apparatus of claim 11 wherein the first encryption scheme is an advanced encryption standard ("AES") encryption, a triple data encryption standard ("TDES"), Rivest Sahmir Adleman ("RSA") encryption, a Blowfish encryption, a Twofish encryption, a format preserving encryption ("FPE") or an elliptic curve cryptography ("EEC") encryption.

15. The apparatus of claim 11 wherein the second encryption scheme is an advanced encryption standard ("AES") encryption, a triple data encryption standard ("TDES"), Rivest Sahmir Adleman ("RSA") encryption, a Blowfish encryption, a Twofish encryption, a format preserving encryption ("FPE") or an elliptic curve cryptography ("EEC") encryption.

16. The apparatus of claim 11 wherein the third encryption scheme is an advanced encryption standard ("AES") encryption, a triple data encryption standard ("TDES"), Rivest Sahmir Adleman ("RSA") encryption, a Blowfish encryption, a Twofish encryption, a format preserving encryption ("FPE") or an elliptic curve cryptography ("EEC") encryption.

17. The apparatus of claim 11 wherein when re-encrypting the third encryption scheme:

the encryption engine is further configured to:

segment the dataset into a plurality of data segments; and encrypt each data segment with a different encryption scheme from the plurality of encryption schemes; and the memory is further configured to store each data segment in a different location within the memory.

18. The apparatus of claim 11 wherein the access points includes at least one network connection.

19. The apparatus of claim 11 wherein:

the computing platform is a classical computing platform;

the quantum randomizing engine and the quantum optimization engine are configured to execute on a quantum computing platform; and the quantum computing platform is in electronic communication with the classical computing platform.

20. The apparatus of claim 11 wherein when identifying the access points:

the artificial intelligence engine is further configured to identify a plurality of access points;

the quantum optimization engine is further configured to assign a score to each of the plurality of access points; and the artificial intelligence engine is further configured to select a group of access points that are assigned a score greater than/equal to a threshold score.

* * * * *